(12) United States Patent
Uchihachi et al.

(10) Patent No.: US 6,535,639 B1
(45) Date of Patent: Mar. 18, 2003

(54) AUTOMATIC VIDEO SUMMARIZATION USING A MEASURE OF SHOT IMPORTANCE AND A FRAME-PACKING METHOD

(75) Inventors: Shingo Uchihachi, Cupertino; Jonathan T. Foote, Menlo Park; Lynn Wilcox, Portola Valley, all of CA (US)

(73) Assignees: Fuji Xerox Co., Ltd., Tokyo (JP); Xerox Corporation, Stamford, CT (US)

( * ) Notice: Subject to any disclaimer, the term of this patent is extended or adjusted under 35 U.S.C. 154(b) by 0 days.

(21) Appl. No.: 09/267,529

(22) Filed: Mar. 12, 1999

(51) Int. Cl.[7] .............................. G06K 9/36; G06K 9/62; H03M 7/00; G06T 11/20; G06F 17/30

(52) U.S. Cl. ...................... 382/225; 382/171; 382/173; 382/209; 382/224; 382/226; 382/240; 382/305; 341/79; 345/440; 707/3; 707/10; 707/104.1

(58) Field of Search ................................. 382/173, 224, 382/225, 226, 240, 284, 103, 164–165, 171, 305, 168, 176, 232, 233, 254; 348/700, 169; 707/3, 2, 5, 10, 104.1, 500.1, 501.1, 514, 516; 345/440; 341/79

(56) References Cited

U.S. PATENT DOCUMENTS

| | | | | |
|---|---|---|---|---|
| 5,210,799 A | * | 5/1993 | Rao ............................ | 382/103 |
| 5,243,149 A | * | 9/1993 | Comerford et al. ....... | 178/18.03 |
| 5,325,449 A | * | 6/1994 | Burt et al. .................. | 382/240 |
| 5,488,674 A | * | 1/1996 | Burt et al. .................. | 382/284 |
| 5,606,655 A | * | 2/1997 | Arman et al. ............... | 345/440 |
| 5,664,227 A | | 9/1997 | Mauldin et al. ............. | 707/51 |
| 5,708,767 A | | 1/1998 | Yeo et al. .................... | 345/440 |
| 5,821,945 A | * | 10/1998 | Yeo et al. .................... | 345/440 |
| 5,920,856 A | * | 7/1999 | Syeda-Mahmood ........... | 707/3 |
| 6,061,603 A | * | 5/2000 | Papadopoulos et al. ....... | 700/83 |

OTHER PUBLICATIONS

Y. Taniguchi, A. Akutsu, Y. Tonomura. "Panorama Excerpts:" Extracting and Packing Panoramas for Video Browsing, Proc ACM Multimedia 97. pp. 427–436, 1997.

Shahraray. B. and Gibbon. D.C., "Automated Authoring of Hypermedia Documents of Video Programs". Proc. ACM Multimedia 95. pp. 401–409, 1995.

(List continued on next page.)

*Primary Examiner*—Leo Boudreau
*Assistant Examiner*—Daniel G. Mariam
(74) *Attorney, Agent, or Firm*—Fliesler Dubb Meyer & Lovejoy LLP (57) ABSTRACT

A measure of importance is calculated for segmented parts of a video. The segmented parts are determined by segmenting the video into component shots and then merging by iteration the component shots based on similarity or other factors. Segmentation may also be determined by clustering frames of the video, and creating segments from the same cluster ID. The measure of importance is calculated based on a normalized weight of each segment and on length and rarity of each shot/segmented part. The importance measure may be utilized to generate a video summary by selecting the most important segments and generating representative frames for the selected segments. A thresholding process is applied to the importance score to provide a predetermined number or an appropriate number generated on the fly of shots or segments to be represented by frames. The representative frames are then packed into the video summary. The sizes of the frames to be packed are predetermined by their importance measure and adjusted according to space availability. Packing based on a grid and an exhaustive search of frame combinations to fill each row in the grid. A cost algorithm and a space-filling rule are utilized to determine the best fit of frames. The video summary may be presented on either a paper interface referencing or a web page linking the frames of the summary to points of the video.

41 Claims, 9 Drawing Sheets

OTHER PUBLICATIONS

Yeo, B–L., and Yeung, M., "Classification, Simplification and Dynamic Visualization of Scene Transition Graphs for Video Browsing." in *Proc. IS&T/SPIE Electronic Imaging: '98:Storage and Retrievel for Image and Video Databases VI*.

Yeung. M., and Yeo, B–L., "Video Visualization for Compact Presentation and Fast Browsing of Pictorial Content." in *IEEE Trans. Circuits and Sys. For Video Technology*, vol. 7, No. 4, pp. 771–785, Oct. 1997.

Boreczky, J. and Rowe, L., "comparison of Video Shot Boundary Detection Techniques" Proc.SPIE Conference on Storage and Retrieval for Still Image and Video Databases IV, San Jose, CA Feb., 1996, pp. 170–179.

F. Arman, R. Depommier. A. Hus, M.–Y. Chiu. "Content–based Browsing of Video Sequences.", In *Proc. ACM Multimedia 94*. San Franscisco, Oct. 1994. pp. 97–103.

\* cited by examiner

Packing keyframes into a row block

AUTOMATIC VIDEO SUMMARIZATION USING A MEASURE OF SHOT IMPORTANCE AND A FRAME-PACKING METHOD

BACKGROUND OF THE INVENTION

1. Field of the Invention

This invention is related to the summarization of video or motion images. The invention is more particularly related to determining a measure of importance of each of shots or segments from a video. The invention is also related to creating or printing a video or motion picture summary packed in a configuration for either emphasizing or de-emphasizing the importance of each segment or shot in the summary. The invention is further related to a method for packing different sized frames into a video summary such that a least cost packing (least weighted amount of resizing) is required for displaying the summary. The invention is still further related to utilizing the least cost packed video summary as an interface to a video browsing system.

2. Discussion of the Background

With the increasing use of video and storage of events and communication via video (Internet communications, increased television bandwidths and channels, increased use of video in Newscasts, etc.), video users and managers are confronted with additional tasks of storing, accessing, determining important scenes or frames, and summarizing videos in the most efficient manner.

A "shot" is a segment of video or motion image that is typically contiguous in time and visual space. Techniques exist to automatically segment video into its component shots, typically by finding the large frame differences that correspond to cuts, or shot boundaries. In many applications it is desirable to automatically create a summary or "skim" of an existing video, motion picture, or broadcast. This can be done by selectively discarding or de-emphasizing redundant information in the video. For example, repeated shots need not be included if they are similar to shots already shown (i.e., discarding less important information, such as repeated or common scenes).

Shahraray et al., at ATT Research have worked on using key frames for an HTML presentation of video. They picked one key frame from each shot without specific concern about reducing the number of key frames to decrease redundancy. The key frames are uniformly sized and simply laid out in a column along with text which was extracted from closed-caption data. No packing efforts were incorporated into their work.

Taniguchi et al., have summarized video using a 2-D packing of "panoramas" which are large images formed by compositing video pans. In their method, key frames were extracted from every shot and used for a 2-D representation of the video content. Frames were not selected to reduce redundancy. Their packing procedure was somewhat sub-optimal, leaving white space in the resulting composites.

Yeung et al., have made pictorial summary of video using a "dominance score" for each shot in the video, however details on how to implement such a score and how to utilize it are ad hoc. Also, the pictorial summaries use a special and predetermined structure that can be used only for a poster-like representation with which the time order of frames is often discarded.

Some other tools built for browsing the content of a video are known, but only provide inefficient summarization or merely display a video in sequence "as it is".

SUMMARY OF THE INVENTION

The present inventors have realized that in order to increase the efficiency with which video summaries are generated, that a quantitative measure of shot or segment importance is needed. Such a quantitative measure could be utilized to determine which shots or segments of a video are most meaningful. The present inventors have also realized that such a quantitative measure would be best if determined objectively via calculation or formulation, thereby allowing the shot or segment selection process to be automated.

In addition, the present inventors have also realized that the quantitative measure may also be utilized to generate a video summary having only the most important shots or segments, and may be utilized in determining which shots or segments of a summary to emphasize (more important information) or de-emphasize (less-important information) by either increasing or reducing the sizes of representative frames (also referred to as keyframes).

Furthermore, the present inventors have determined a packing method for efficient 2-D presentation of each of the emphasized and de-emphasized shots or segments selected for summary. Thus, once shot importance is determined, a 2-dimensional still representation can be constructed by efficiently packing representative keyframes for each shot or segment sized relative to importance.

Accordingly, it is an object of the present invention to provide a method of determining importance of shots or segments in a video, including the steps of segmenting the video into shots or related frames; and calculating an amount of importance for each shot or segment. The step of segmenting also includes the step of clustering the frames of the video based on at least one of a common attribute and matching criteria or algorithm.

It is another object of the present invention to provide a method of summarizing a video, including the steps of determining an importance of component shots of the video; selecting component shots or segments to be used in a summary based on their importance and extracting representative frames from the selected component shots; and presenting the representative frames in a video summary. The step of presenting includes the step of sizing each representative frame based on the importance of the shot from which the frame is extracted and an amount of space in a pre-determined bounded area for display of the summary, and packing the representative frames into the pre-determined bounded area.

It is also an object of the present invention to provide a method for packing a sequence of frames into a bounded area, including the steps of fitting frame sequences to the bonded area, and selecting a frame sequence having a leased cost for the bounded area.

It is also an object of the present invention to provide an interface for viewing the video summary. The interface may be, but is not limited to, paper having the video summary printed along with reference codes linked to a starting point or portion of the video for each frame of the summary, or a web based interface with links corresponding to one or more starting points or portions of the video.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The present invention presents a measure of shot or segment importance. An immediate application is printing a video summary, where key frames from important shots or segments are printed, while those of lesser importance are not. In the present embodiment, less important keyframes are printed in a smaller size, leading to a "comic-book" or "manga" layout. A novel method is presented for efficiently packing different-sized keyframes.

Many techniques exist to automatically segment video into its component shots, typically by finding the large frame differences that correspond to cuts, or shot boundaries. Once detected, shots can be clustered by similarity such that similar shots (e.g. similar camera angles or subjects) are considered to be one shot or cluster. For example, a film dialog where the camera repeatedly alternates between two actors would typically consist of two clusters, one for each actor.

Once segmented, shots can be clustered by similarity. Clusters can also be determined without prior segmentation of the video into shots. The method used here is hierarchal clustering, where initially each frame in the video (or a sub-sampled representation) is assigned a unique cluster. The number of clusters is reduced by interactively merging the two closest clusters at each step, based on the minimum distance between all combinations of the two cluster member frames. To compare the distance between frames, a number of techniques are available, such as color-histogram distances or transform-coefficient distances. Hierarchal clustering results in a tree-structured representation such that individual frames are on the leaves of the tree.

At the root node of the tree is the maximal cluster consisting of all the frames. The children of each node are the sub-clusters that were merged to form the node and so forth down to the leaves. If the distance of the merged clusters is stored with each node, it can be used to select a desired number of clusters by thresholding. Setting a threshold distance below which frames are assumed to be in the same cluster can adjust the number between one (the root of the tree) and the number of frames (the leaves of the tree).

The optimal number of clusters depends on the type and length of the video. Once clusters have been selected, each frame is labeled with its corresponding cluster. Segments, or shots, are defined by sequences of frames in the same cluster.

Given C clusters in the video, a measure of normalized cluster weight is denoted $W_i$ for cluster i and computed as:

$$W_i = \frac{S_i}{\sum_{j=i}^{c} S_j} \quad \text{Equation 1}$$

where $S_i$ is the total length of all shots or segments in cluster i, found by summing the length of all shots or segments in the clusters $W_i$ is the proportion of shots or segments from the whole video that are in cluster i.

A shot or segment is important if it is both long and rare, that is, it does not resemble most other shots or segments. Thus weighting the shot or segment length with the inverse of the cluster weight yields a measure of shot or segment importance. Thus the importance I of shot j (from cluster k) is:

$$I_j = L_j \log \frac{1}{W_k} \quad \text{Equation 2}$$

where $L_j$ is the length of the shot j.

The importance measure becomes larger if the shot is long, and smaller if the cluster weight is large (meaning the shot is common). The importance can also be weighted by other factors, such as the magnitude of the change that starts the shot, computed as the difference of the color histogram, pixel difference, or transform coefficient difference. This decreases a shot's importance if it is not greatly different from the preceding shot.

The constant l inside the log function can be replaced with a weighting factor $\alpha$ to control the tradeoff between shot length and cluster weight:

$$I_j = L_j \log(\alpha/W_k) \quad \text{Equation 3}$$

A large $\alpha$ value means that the cluster weight will contribute less to the importance, while decreasing $\alpha$ increases the contribution of the cluster weight to the importance measure. It is often required to preferentially weight certain shot categories. For example close-ups of a person might be preferable to wide crowd shots. The importance weight can be modified to reflect this by including an amplification factor.

$$I_j = (\Sigma_t A_t P_t(S_j)) L_j \log(1/W_k) \quad \text{Equation 4}$$

$A_t$ is a predetermined amplification factor for the category t, (for example, category t might be a close-up which would be weighted more favorably, or a crowd scene or motion which would have less weight). $P_t(S_j)$ is an estimate of the probability that shot $S_j$ belongs to the category t. Equations (3) and (4) can be combined to allow weighting of both shot length and individual clusters, as shown in Equation (5), below.

$$I_j = L_j \log(\Sigma_t A_t P_t(S_j)/W_k) \quad \text{Equation 5}$$

Figure 1:
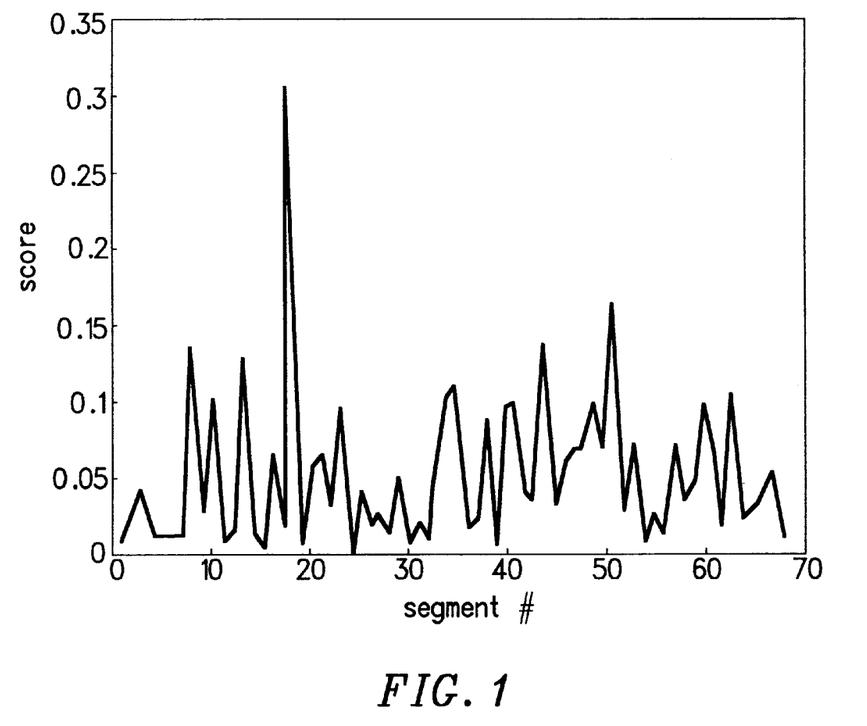
FIG. 1 is a graph of an importance calculation for each segment or shot in a video presentation.

Referring now to the drawings, wherein like reference numerals designate identical or corresponding parts throughout the several views, and more particularly to FIG. 1 thereof, there is illustrated a graph representing the calculated importance values for segments of a video clip. The video clip was divided into 69 segments or shots by hierarchal clustering, each being represented by a point on the graph. Importance values for each point are from almost negligible (point 24, for example), to a high of approximately 0.3 (see point 18).

Once the importance has been calculated for each shot, a summary of the video can be produced. Once constructed, representative, still frames or keyframes, are associated with each shot. This can be done by picking, say, the first frame of the shot, or with more sophistication by finding a frame that "best" characterizes the shot. For example, a good choice might be a frame nearest the centroid of all shot frames (using a distance metric as in the clustering above). A number of criteria are available for selecting representative frames, for example the presence of a face from a face detector, the absence of motion, or other considerations When shots are labeled with importance, the importance value can be subjected to a threshold to select a desired number of shots, and hence keyframes for a summary. Once frames have been selected, they may be laid out in one or more dimensions to form a pictorial abstract of the video sequence. Two dimensions might be most appropriate for a printed synopsis, such as a "comic book" format. Other formats, incorporating sequential presentation or overlay characteristics may also be utilized.

Figure 2A:
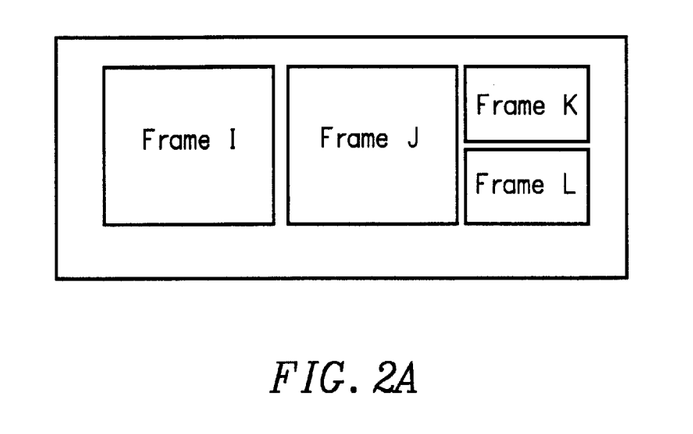
FIG. 2A is a layout diagram of frames sized and packed based on importance.

Thresholding the importance score allows the desired number of frames to be displayed at the appropriate level. To facilitate layout, frames may be displayed in smaller or bigger sizes, perhaps depending on their importance score. For example, this might result in a layout as in FIG. 2A. The "major" shots I and J (major because they have high importance scores) are represented by full-sized frames. Shots K and L must share a section but this is not unreasonable if they are less important.

The thresholding process itself may be performed in different ways. For example, a value of importance may be selected, say above 0.15, and all segments scoring at least 0.15 are selected for the summary. Alternatively, an optimal number of shots may be determined, 4 for example, and the threshold level is moved up until only 4 segments are remaining (essentially selecting the 4 highest scoring segments).

Applying these techniques to the chart in FIG. 1, a threshold of 0.15 results in the selection of a single segment for the video summary. Using the alternative technique, the threshold is lowered to approximately the 0.12 level and 4 frames (keyframes) remain for layout in the summary.

Frame sizes are also selected by thresholding the importance score. For example, suppose three frame sizes are specified. Keyframes of the smallest size are used if the importance score is above the threshold but less than 1/3 the distance to the max score. Keyframes twice the size of the smallest are chosen for those segments more than 1/3 the distance to the max score but less than 2/3 the distance. Segments between the max score and 2/3 the distance are largest.

Given suitable constraints, the layout process may be automated so that a sequence of differently-sized keyframes may be turned into a reasonable page (or other) layout without user intervention. Ideally, the user would need to specify only a few parameters, such as the number of pages, the number of sections per page, and the allowable range of keyframe sizes. In the above examples there is a range of only two keyframe sizes, others are certainly possible.

Figure 3:
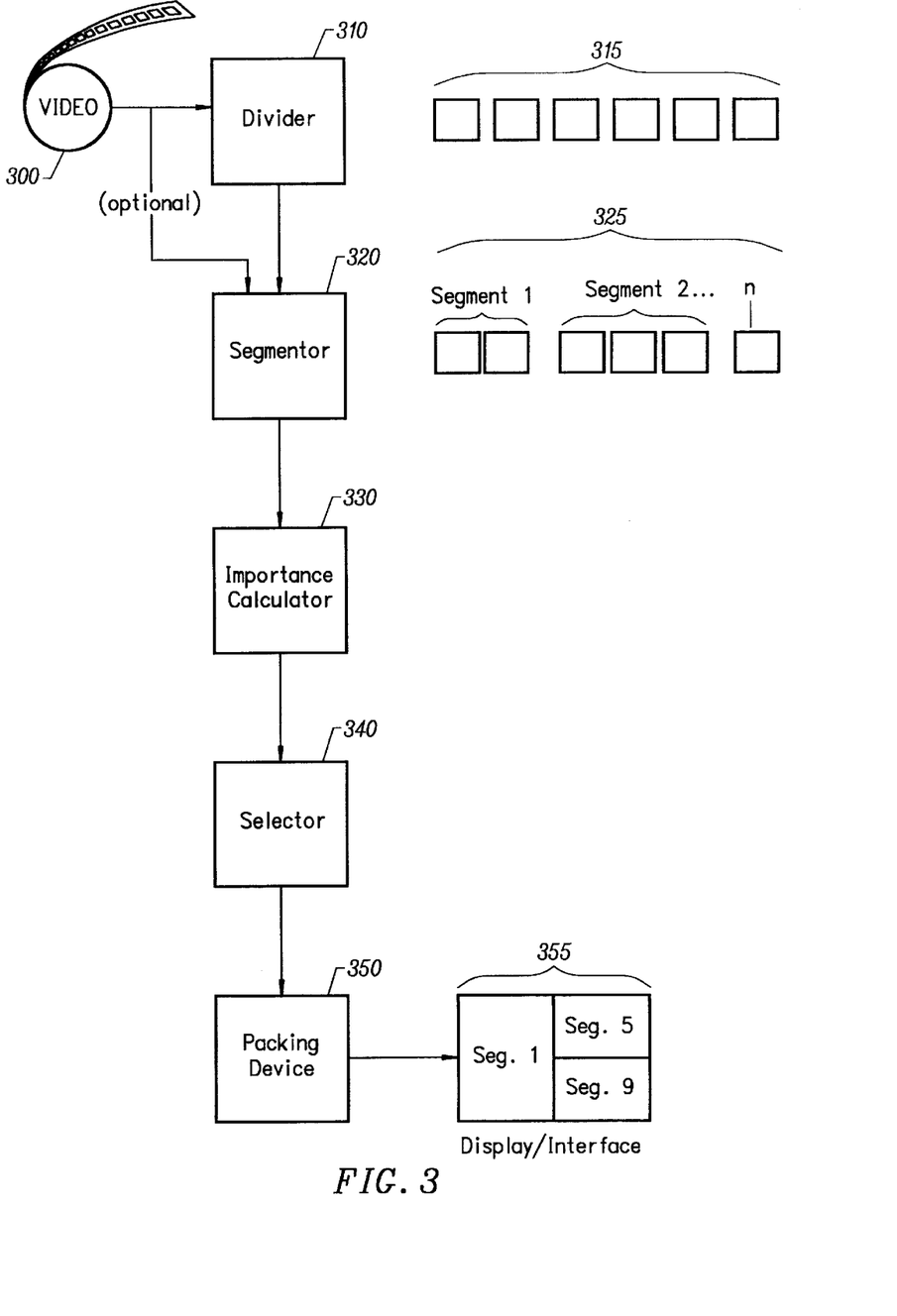
FIG. 3 is a block diagram of segmentation, cluster, and packing devices.

Thus, the entire process may be illustrated as shown in FIG. 3. A video 300 is fed into a divider 310 to divide the video into frames 315. The frames 315 are fed into a segmentor 320 that may utilize any of the above described processes (clustering, hierarchical tree, etc) to produce segments 1...n 325 (Alternatively, the video 300 is divided into component shots and then fed into the segmentor 320, or the video 300 may be fed directly into the segmentor 320). The segments or shots are then fed into an importance calculator 330 that calculates an amount of importance for each segment or shot. A selector 340 then selects representative frames from each segment or shot. Once the representative frames are selected, a packing device 350 resizes and packs them in an efficient arrangement according to importance for display/interface 355.

Given that frames can be selected from shots, the layout problem reduces to finding a sequence of frame sizes that both fills space efficiently and represents the original video sequence well. An appropriate cost function may be utilized to define a degree of matching. However, it is difficult to find an optimal sequence because the number of possible sequences increases enormously with the size of the space.

Existing techniques such as Dynamic Programming (DP) and greedy algorithms can be used to find an optimal or near-optimal layout. Dynamic Processing is guaranteed to find the optimal solution for this kind of problem, but many elaborate and troublesome adjustments are required. A greedy algorithm is substantially simpler, yet can fail to produce a reasonable result. A novel packing method is introduced here. It is simpler to apply than DP yet provides a better solution than a purely greedy strategy.

The method can be described as "block exhaustive" as it selects the best sequence of frames to pack a particular "block" or sub-region of the entire space. The best sequence is found by exploring all combinations of layouts for a particular block. Because blocks are relatively small, this does not result in a combinatorial explosion and an optimal layout can be then be found with simple techniques, including a plain tree search.

The space to be packed is divided into a grid, such that one unit of the grid will hold the smallest frame size. This is used to lay out frames as follows: one "row block", or row of columns across the grid, is packed at a time. The matching score for a block varies with its height. The height for a particular block is set to the one that yields the best packing as determined by the packing score. Once a row block has been packed with frames, further row blocks are considered interactively until all frames have been packed.

Given:

A sequence of frame sizes $f_1, f_2, \ldots, f_N$, expressed as multiples of the smallest frame size (In the present embodiment, this is determined from the shot importance score as above, but any size assignment can be used). $f_i$ takes one of K values ($S_1, S_2, \ldots, S_K$).

Select the allowable range of block row heights, as M values ($r_1, r_2, \ldots, r_M$). For example, if row heights of 2 or 3 times the smallest frame size are allowable, then M=2, $r_1$=2, and $r_2$=3. Set the block width to the fixed value W.

A function c(x,y) which is the cost of placing frame x in available remaining space y. A typical cost function might be the size difference between x and y. For example, if the frame needs to be reduced from a 2×2 size to fit into a 1×1 cell, the cost is 1. No resizing has a cost of zero. The cost function can be made quadratic to reflect the actual area difference, or indeed any arbitrary cost function can be used.

Figure 2B:
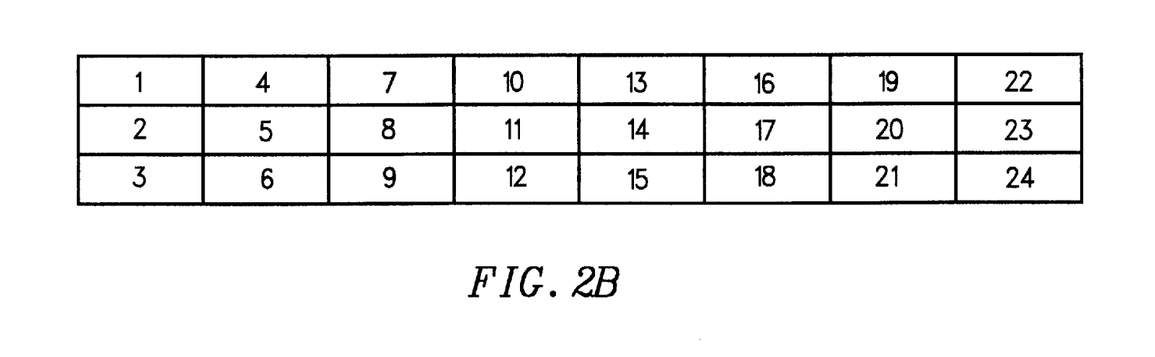
FIG. 2B is example of a row block layout for packing.

A space-filling rule. A typical rule might be column-major, that is from top to bottom and left to right. This is the order in which frames will be preferentially packed. The example shown in FIG. 2B depicts a typical case when the maximum block height is 3 and the block width is 8.

Given the above, the packing method consists of three nested loops that optimize the packing for one row block. The outer loop ranges over all possible row heights ($r_1, r_2, \ldots, r_M$). The middle loop over packs the row block with as many frames as will fit, resulting in the sequence. The inner loop accumulates the cost over all row heights r, possible frame sequences i, and j. These processes are described below in steps 1–7.

1. Set starting frame s to 1.
2. Set row height r to one of M values ($r_1, r_2, \ldots, r_M$).
3. Find all frame sequences $\{q1, q2, \ldots, q_{Lr}\}$ that fit the "row block".
4. From the above sequences, find a sequence $q_1$ of length $n_1$ which fits a portion of the original sequence between s and s+$n_1$ where $$1 = \arg\min_i \left( \frac{1}{n_i} \sum_{j=1}^{n_i} c(f_{s+j-1}, q_{ij}) + w_i \right)$$

$f_i$ indicates ith frame size of the original sequence. $q_{ij}$ is the jth element of sequence $q_i$. $w_i$ is an additional weighting factor 5. Repeat 2 and 3 to find the best row height r and corresponding sequence q of length n. This is the optimal packing for this row block.
6. Increase s by n.
7. Repeat 2 to 6 until s reaches N, the length of the original sequence (all frames are packed).

Step 2 above is done by 1) exhaustively generating all sequences of length from 1 to r×W whose jth element is one of K values ($s_1, s_2, \ldots, s_k$), and 2) eliminating all generated sequences that do not fit the "row block." For example:

1) if the block height is 2, sequences containing a 3 element do not fit; and 2) if the block width W is 8 and the maximum row height is 3, sequences of all 3s longer than 3 do not fit.

Though there are a possible $(r \times w)^K$ sequences to consider, r, W, and K are very small so efficiency is not a great concern.

Figure 4:
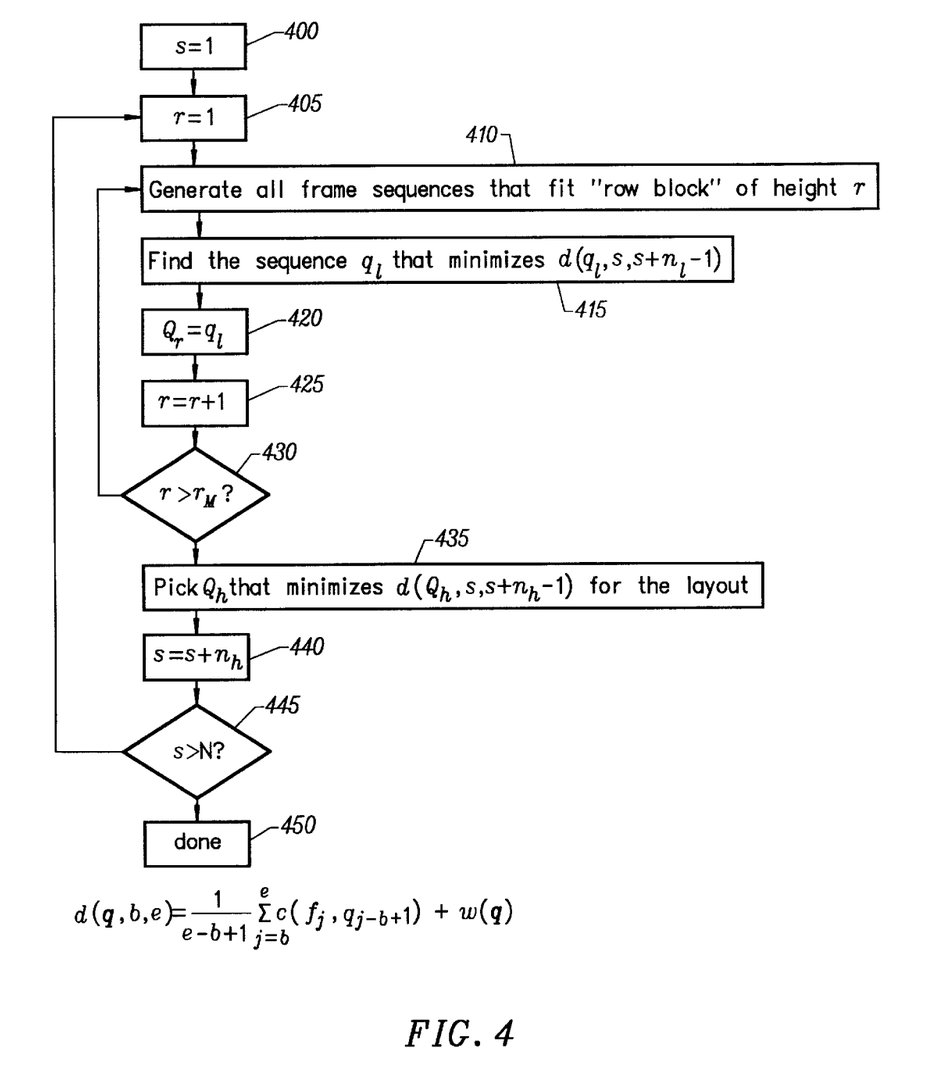
FIG. 4 is a flow chart describing the packing process.

FIG. 4 is flow chart illustrating an example flow of the above-described process. FIG. 4 includes step 400 setting of initial variables in outerloop 405/445 and maintains the starting position of the frames to be fit to a block. An innerloop 410/430 generates frame sequences for each possible row block height and a cost algorithm d($q_1$,s,s+$n_{i-1}$) is utilized to determine a cost for fitting each row block. After determining the minimum sequence for each row height, the minimum for the entire row block is selected and the process repeat.

The repeating process begins with frame after the last frame that fit in the previous minimum row block. After all frames are packed, the process is completed, step 450. Table 1 identifies the nomenclature utilized in the flowchart of FIG. 4.

TABLE 1

| | |
|---|---|
| s | starting frame |
| r | selected row height for the "row block" |
| $q_1, q_2, \ldots q_{Lr}$ | frame sequences that fit the "row block" with height r |
| d (q, b, e) | distance/cost algorithm |
| $Q_r$ | minimum frame sequence d ($q_1$, s, s + $n_1$) for the "row block" with height r |
| $n_1$ | ending frame of minimum frame sequence for the "row block" with height r |
| $r_M$ | Maximum row height |
| $Q_h$ | minimum frame sequence d ($Q_h$, s, s + $n_h$) for the "row block" of all row heights |
| $n_h$ | ending frame of minimum frame sequence for all row heights |
| $f_1, f_2 \ldots f_N$ | individual frames |
| $r_1, r_2 \ldots r_m$ | range of block row heights |
| W | fixed block width |
| c (x, y) | cost of placing frame x, in space y |
| $q_{ij}$ | jth element of sequence i |
| $s_1, s_2, \ldots s_K$ | frame sequence |

Frames - individual frames.
Shots - groups of related frames, camera angle, scene.
Clusters - groups of related shots or frames.

Figure 5:
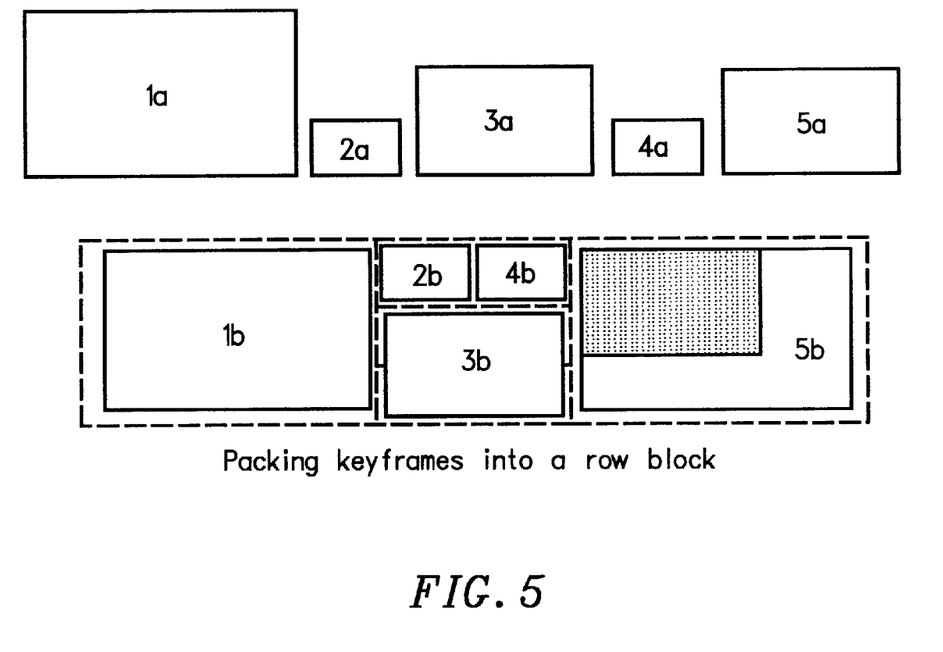
FIG. 5 is an illustration of a packed frame sequence with re-sizing to minimize white space.

An example of a product of this "row block" packing procedure is depicted in FIG. 5. The rectangles 1a–5a at the top of the figure are the original frame sequence, sized by importance. The bottom picture illustrates the frames packed into a row block of height 3 and width 8 (now illustrated as rectangles 1b–5b). Note that the size of frame 5b has been increased from the original (indicated as a shaded rectangle) for better packing with minimal white space.

Experiments

The present inventors have tested the methods described above on a videotaped staff meeting. The video is approximately 50 minutes long and consists of 49 actual shots, counting between actual camera changes. Still frames were extracted from the video every 15 seconds, and were clustered into 51 clusters using the Euclidean distance of high-variance DCT coefficients as a distance metric. Occasionally, frames from the same shot were divided into different clusters because of large changes such as camera motion or change in room lighting change. As a result, the entire video was divided into 92 segments. For each segment, an importance measure was calculated based on its length and cluster weight as described above.

Video segments having high importance scores were chosen to generate a still synopsis. Segments scoring higher than one eighth of the maximum score (using the unweighted calculation of Equation 2) were selected. For each segment chosen, a frame nearest the segment mean was extracted as a representative frame, again using the Euclidean distance of reduced DCT coefficients. Frames were sized according to the importance measure of their originating segments, so higher importance frames were larger.

In the current embodiment, if the importance of a given frame was between one eighth and one quarter of the maximum, it was assigned the smallest frame size. Frames scoring more than one quarter but half less than half of the maximum were sized twice the smallest size, and frames scoring higher than one half were sized three times larger than the smallest. Approximate frame size percentages can be set by empirically determining thresholds. For example, if it is desired that half of all displayed frames are the largest size, the upper threshold can be determined from the cumulative importance scores (though some frames will be resized via the packing method).

After assigning frame sizes, the following two procedures are applied to further eliminate redundant frames. The two procedures are applied repeatedly until no more elimination can be seen.

Trimming Branches

If two consecutive frames are from the same cluster, the smaller frame is eliminated. If both frames have the same size, the latter one is eliminated while the earlier one may be enlarged.

Eliminating Islands

If three frames from the same cluster each separated by one frame are found, and the middle one is the smallest one, the middle one is eliminated.

Figure 6:
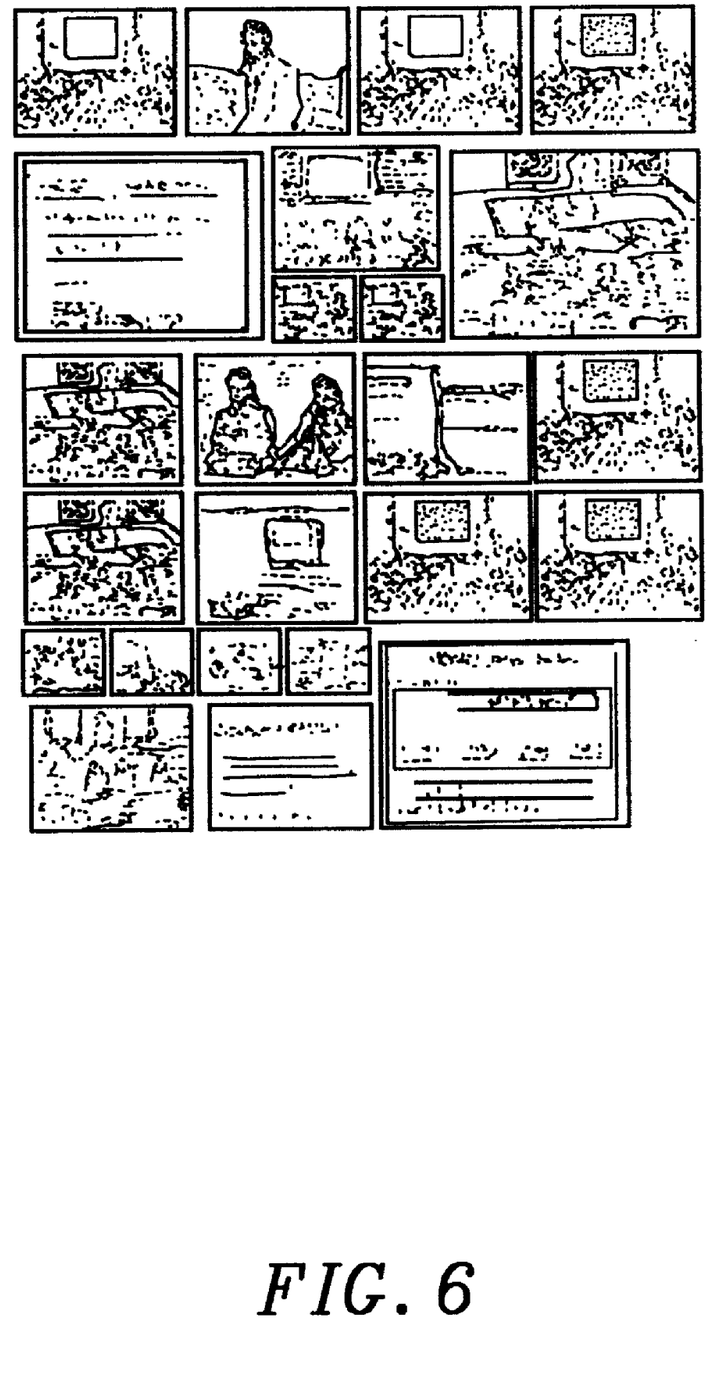
FIG. 6 is a video summary product resulting from packing based on importance.

In the case of our sample video, the number of extracted frames of size 1, 2, 3 were 9, 13, and 2 respectively. We have chosen a straightforward assignment of frame sizes to importance scores: many other assignments, including continuously variable sizes, are possible. The differently-sized frames were packed using the method previously described. The result is shown in FIG. 6; only six frames out of 24 needed size adjustment for this packing. The summary above can be enhanced by any number of methods, such as displaying text annotations, titles, or even transcriptions together with the frames. Text can be displayed superimposed on each frame as a caption or speech balloon. Frames can be highlighted to show special time or index marks, for example by using a colored border. Frames can be de-emphasized by importance or other score, for example by displaying them with less contrast (washed out) or color (grayscale).

Paper Interface of Video

Figure 7:
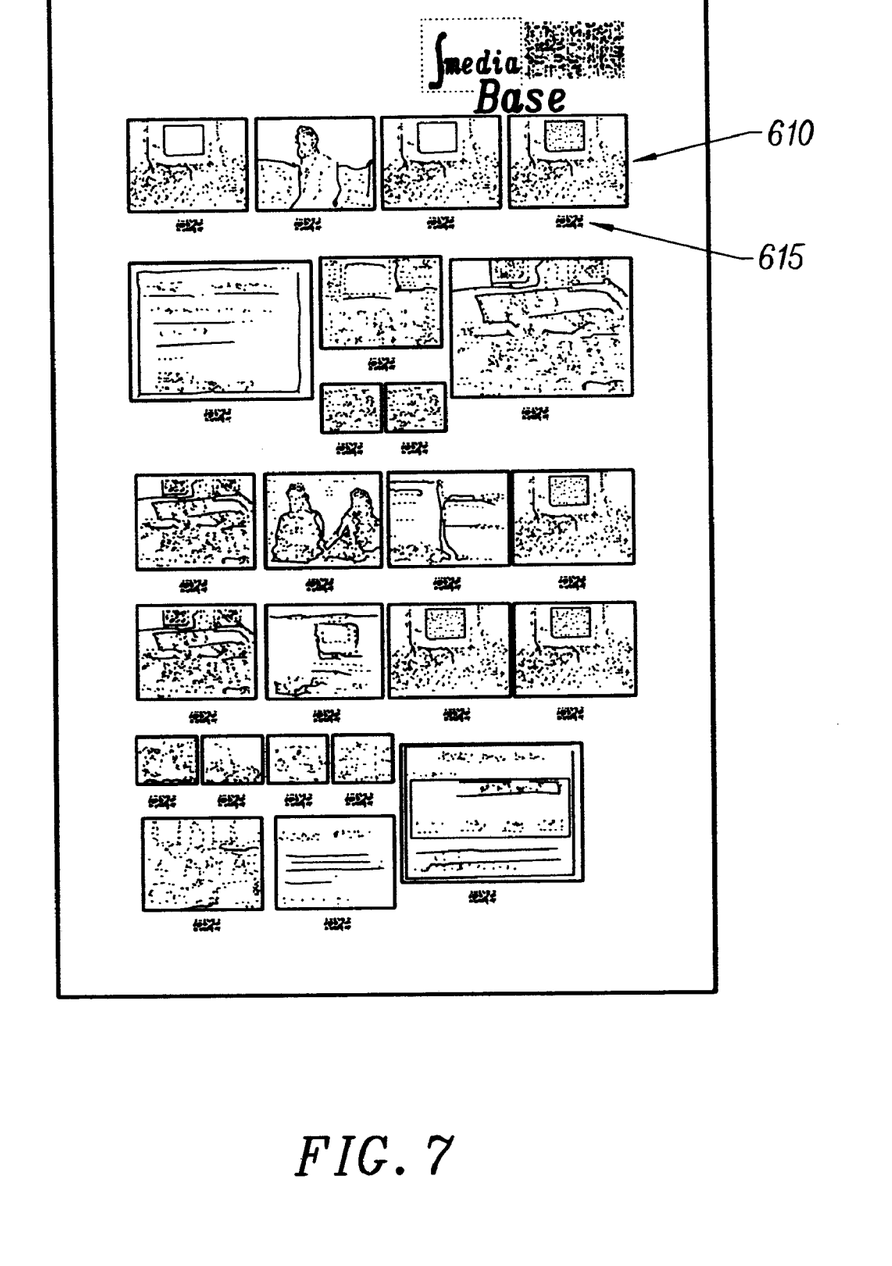
FIG. 7 is a paper summary of video frames laid out according to the present invention.

The methods described above can be easily applied to a video database system using a paper user interface. Each video in a video database is summarized using the described methods and printed along with coded information pointing back to the original video. FIG. 7 illustrates the paper interface for each printed frame (610, for example), and corresponding coded information 615.

Information can be coded using any of a number of methods, including text, glyph codes or bar codes. Frames in a summary can also be labeled with time codes that indicate starting times of the shots represented by the frames. Time codes for each frame can be placed anywhere the correspondence is obvious, such as underneath each frame or even encoded in the actual frame image, or with call-outs or graphical indications.

Figure 8:
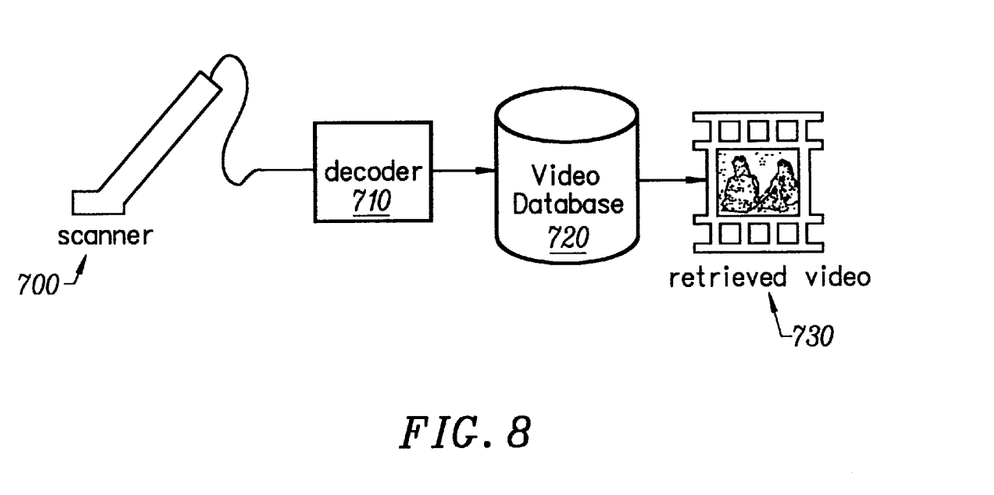
FIG. 8 is an illustration of an equipment layout for utilizing a video paper summary.

FIG. 8 illustrates a typical embodiment of the system. Basic components are a hand-held glyph scanner 700, a glyph decoding unit 710 and a video storage 720 and playback device 730. A user selects a desired video by scanning the glyph code printed in the paper summary. A particular shot from that video can then be selected by scanning the glyph attached to the representative frame. Alternatively, the glyph could encode both video and shot. The decoder decodes the scanned glyph codes and the output from the decoder is sent to a video database to retrieve and play back the video at the specified location. Video may start from the beginning of a segmentation that the selected key frame is representing, or it may start at the point where the selected representative frame is extracted. Other printed glyphs can control other presentation aspects such as volume or playback, for example.

Video may be modified during playback to emphasize the measure of shot importance. For example, lowering the volume or increasing the playback rate could be used to de-emphasize less important shots. Shots less important than a particular threshold can be skipped entirely, resulting in a summary or "video skim." Multiple frames and their corresponding shots can be selected by a user to generate a personal video summary. For this operation, a user may have to scan a dedicated code before and after selecting the frames. This procedure can be replaced by pressing a button in the system. It is not essential for the scanner to be hand-held, flatbed scanners can be used instead. In that case, a check box could be attached to a frame instead of glyph code, and a user would specify a shot by marking one or more of the check boxes (FIG. 7, for example).

Web-Based Video Interface

In addition to paper, much of the above functionality can be used for a web-based video user interface. The video summary can be constructed exactly as before, but rendered to a hypertext form rather than paper. A user could generate a video summary by clicking a name of the video in listing or a functionally equivalent expression. Various parameters, such as size and the number of frames in the summary can be specified in the request. The generated summary is sent back to the client for display in a web browser or printed in paper form. This can be done in at least two ways. One way is to generate a complete bit-mapped image at the server and send it to the client. Another way is to send image files and layout information from the server and let the client compose the summary.

The server can also generate a table containing all pertinent shot information, such as starting time and duration, key frames index, and layout information. This table may be kept either on server side or client side. When a mouse click is detected on a summary, the click location can be mapped through the table to determine the specified video and shot. Then the starting time can be determined and used to invoke a video player. Thus a user can skim through a content of a video by looking at a summary, and begin going in details by clicking at any of the frames in the summary which is a trigger for a video to be played back from a position or segment of the video corresponding to the frame clicked on.

Figure 9:
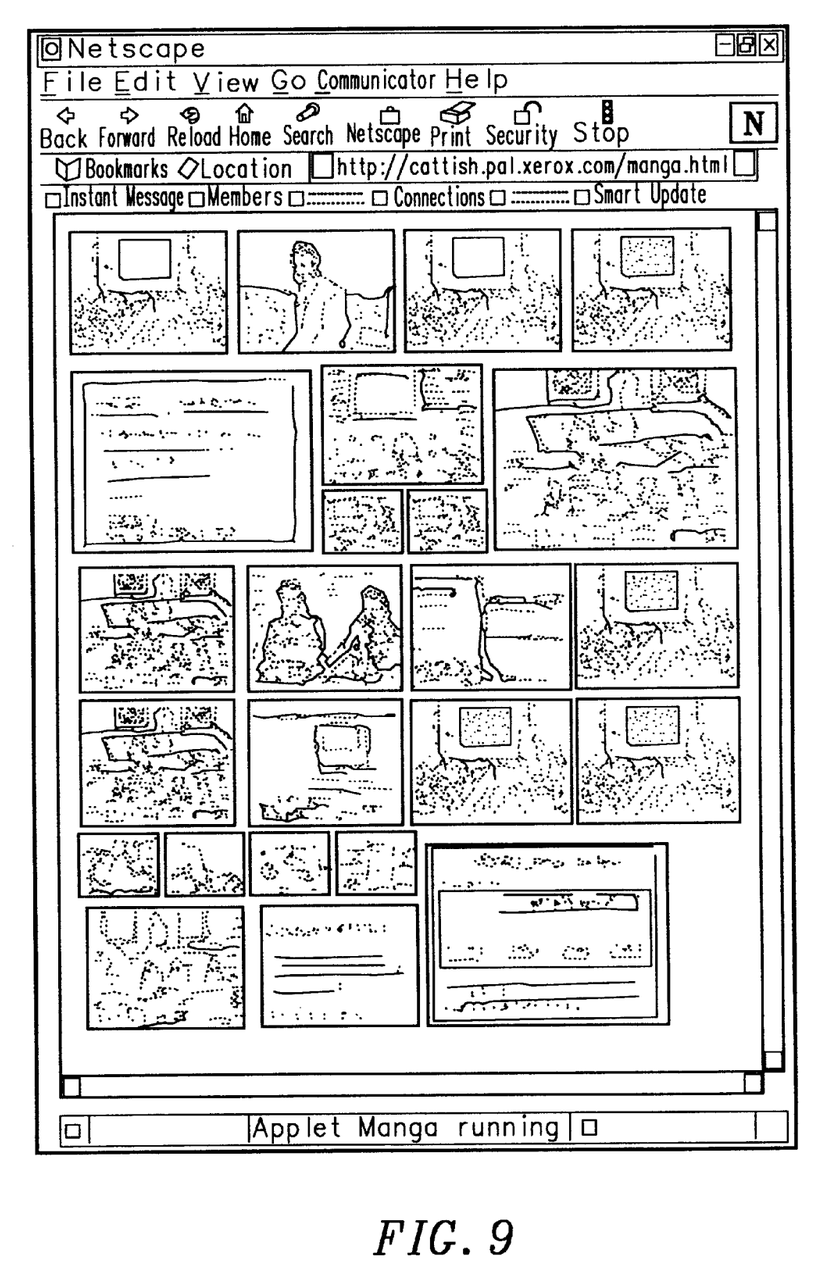
FIG. 9 is an illustration of a video summary web interface according to the present invention.

An example of web interface is shown in FIG. 9, which has a similar appearance to the previous paper interface.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMS, microdrive, and magneto-optical disks, ROMs, RAMs, EPROMs, EEPROMs, DRAMs, VRAMS, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, segmentation of video, calculation shot importances, clustering, packing, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

We claim:

1. A method of determining the importance of segments in a video, comprising the steps of:
   dividing the video into segments, each segment comprising at least one related frame of the video;
   clustering segments of the video based on at least one of a common attribute and a matching criteria to produce at least one segment cluster;
   calculating a weight for each segment cluster; and
   calculating an amount of importance for each segment in the video based on the length of the segment and the inverse weight of the segment cluster containing the segment.

2. The method according to claim 1, wherein:
   said step of clustering segments of the video comprises the steps of,
      placing each frame of the video on a leaf of a hierarchical tree, wherein a root node of the tree is a maximal cluster containing all frames in the video, and
      joining related frames into segments based on at least one of a common attribute and matching criteria to create intervening nodes, clusters, of said hierarchal tree.

3. The method according to claim 1, wherein said step of clustering segments of the video comprises the steps of:
   evaluating at least one of proximity in time, proximity in space, proximity in color, minimum distance, color-histogram distances, and transform-coefficient distance between each segment; and
   combining segments matching a predetermined threshold of the evaluating step.

4. The method according to claim 1, wherein said step of calculating a weight of each cluster, comprises the step of:
   determining a weight Wi of a cluster based on at least a formula comprising, $$W_i = \frac{S_i}{\sum_{j=i}^{c} S_j}$$

wherein $W_i$ is the calculated weight of the cluster i, $S_i$ is a total length of all segments in cluster i, and C is a number of clusters in the video.

5. The method according to claim 1, wherein said step of calculating comprises the step of:
   calculating an amount of importance of each segment based on at least a formula comprising, $$I_j = L_j \log(1/W_k);$$

wherein $I_j$ is the importance of segment j; $L_j$ is a length of segment j; and $W_k$ is the calculated weight of the cluster k to which segment j belongs.

6. The method according to claim 1, wherein said step of calculating comprises the step of:
   calculating an amount of importance of each segment based on at least a formula comprising, $$I_j = L_j \log(\alpha/W_k);$$

wherein $I_j$ is the importance of segment j; $L_j$ is a length of segment j; $\alpha$ is a weighting factor, and $W_k$ is the calculated weight of the cluster k to which segment j belongs.

7. The method according to claim 1, wherein said step of calculating comprises the step of:
   calculating an amount of importance of each segment based on at least a formula comprising, $$I_j = (\Sigma_t A_t P_t(S_j)) L_j \log(1/W_k);$$

wherein $A_t$ is an amplification factor, $P_t(S_j)$ is a probability estimate, $I_j$ is the importance of segment j; $L_j$ is a length of segment j, and $W_k$ is the calculated weight of the cluster k to which segment j belongs.

8. The method according to claim 1, wherein said step of calculating comprises the step of:
   calculating an amount of importance of each segment based on at least a formula comprising, $$I_j = L_j \log(\Sigma_t A_t P_t(S_j)/W_k);$$

wherein $A_t$ is an amplification factor, $P_t(S_j)$ is a probability estimate, $I_j$ is the importance of segment j; $L_j$ is a length of segment j, and $W_k$ is the calculated weight of the cluster k to which segment j belongs.

9. A method of determining the importance of segments in a video, comprising the steps of:
   dividing the video into segments, each segment comprising at least one related frame of the video; clustering segments of the video based on at least one of a common attribute and a matching criteria to produce at least one segment cluster; and
   calculating an amount of importance for each segment based on at least a formula comprising, $$I_j = L_j \log(1/W_k);$$

wherein $I_j$ is the importance of segment j; $L_j$ is a length of segment j; and $W_k$ is the calculated weight of the cluster k to which segment j belongs.

10. A method of summarizing content of a video, comprising the steps of:
    dividing the video into segments, each segment comprising at least one related frame of the video;
    clustering segments of the video based on at least one of a common attribute and a matching criteria to produce at least one segment cluster;
    calculating an importance for each segment based on the length of the segment and the inverse weight of the cluster containing the segment;
    selecting a representative frame from each segment; and
    generating a summary of the representative frames, wherein the presentation of each representative frame in the summary is based on the importance of the segment from which it was selected.

11. The method according to claim 10, further comprising the step of:
    thresholding the segments of the video based on the importance of the respective segment.

12. The method according to claim 11 wherein said step of thresholding comprises the steps of:

selecting at least one of a predetermined number of segments having an importance level higher than any non-selected segments and segments having at least a predetermined importance value; and discarding all non-selected segments.

13. The method according to claim 10, wherein said step of selecting comprises the step of:

selecting a representative frame from a respective segment based on a formulation comprising at least one of a first frame of the respective segment, a frame that characterizes the respective segment, a frame nearest a centroid of all frames of the respective segment, a frame having a presence of a face, and a frame having any one of an absence and indicia of motion.

14. The method according to claim 10, wherein said step of generating a summary comprises the steps of:

sizing each representative frame based on an importance of the frame and an amount of space in a predetermined bounded area for display of the summary; and packing the representative frames into the predetermined bounded area.

15. The method according to claim 14, wherein said step of sizing comprises the steps of:

sizing each representative frame based on the importance of the segment from which it was extracted; and adjusting the size of each frame to fit into an open space of a predetermined bounded area of said summary.

16. The method according to claim 10, wherein said summary comprises a paper interface, comprising:

a printout of said summary; and a set of at least one code, each code associated with at least one representative frame of the video;

wherein each code provides an index to at least one of a segment and a starting marker in the video.

17. The method according to claim 10, wherein said summary comprises a web interface, comprising:

a display of said summary; and a set of at least one link, each link associated with at least one of the selected representative frames;

wherein each link accesses at least one of a segment and a starting marker in the video.

18. The method according to claim 10, wherein said step of calculating comprises the step of:

calculating an importance for each segment based on at least a formula comprising, $$I_j = L_j \log(1/W_k);$$

wherein $I_j$ is the importance of segment j; $L_j$ is a length of segment j; and $W_k$ is the calculated weight of the cluster k to which segment j belongs.

19. The method according to claim 10, wherein said step of calculating comprises the step of:

calculating an importance for each segment based on at least a formula comprising, $$I_j = L_j \log(\alpha/W_k);$$

wherein $I_j$ is the importance of segment j; $L_j$ is α length of segment j; a is a weighting factor, and $W_k$ is the calculated weight of the cluster k to which segment j belongs.

20. The method according to claim 10, wherein said step of calculating comprises the step of:

calculating an importance for each segment based on at least a formula comprising, $$I_j = (\Sigma_t A_t P_t(S_j)) L_j \log(1/W_k);$$

wherein $A_t$ is an amplification factor, $P_t(S_j)$ is a probability estimate, $I_j$ is the importance of segment j; $L_j$ is a length of segment j, and $W_k$ is the calculated weight of the cluster k to which segment j belongs.

21. The method according to claim 10, wherein said step of calculating comprises the step of:

calculating an importance for each segment based on at least a formula comprising, $$I_j = L_j \log(\Sigma_t A_t P_t(S_j)/W_k);$$

wherein $A_t$ is an amplification factor, $P_t(S_j)$ is a probability estimate, $I_j$ is the importance of segment j; $L_j$ is a length of segment j, and $W_k$ is the calculated weight of the cluster k to which segment j belongs.

22. The method according to claim 10, wherein said step of calculating comprises the step of:

determining a weight Wi of a cluster based on at least a formula comprising, $$W_i = \frac{S_i}{\sum_{j=i}^{c} S_j}$$

wherein $W_i$ is the calculated weight of the cluster i, $S_i$ is a total length of all segments in cluster i, and C is a number of clusters in the video.

23. A method of packing a set of frames into a bounded area, comprising the steps of:

fitting frame sequences to the bounded area;

calculating a cost d(q,b,e) of each frame sequence utilizing a formula comprising:

$$d(q, b, e) = \frac{1}{e-b+1} \sum_{j=b}^{e} c(f_j, q_{j-b+1}) + w(q)$$

and selecting a frame sequence having a least cost for the bounded area;

where, q is a frame sequence ($q_i$ is the ith element of frame sequence q), b is a starting frame, e is an ending frame, j is a summation marker, c is a cost function, f is a frame size, and w is an importance function.

24. The method according to claim 23, wherein said step of fitting, comprising the steps of:

assigning a row height (r) from a set of row heights;

dividing the bounded area into rows having a height (r);

generating frame sequences fitting the bounded area of row height (r); and repeating said steps of assigning, dividing, and generating for each of said set of row heights.

25. The method according to claim 24, wherein:

said step of fitting includes the step of, placing a lowest cost frame sequence generated for each row height (r) into a low cost frame sequence set; and said step of selecting includes the step of selecting a lowest cost frame sequence from said low cost frame sequence set.

26. The method according to claim 24, wherein said step of dividing, comprises:
dividing the bounded area into a grid having a row height (r) being a multiple of a height of a smallest of frames in said set of frames.

27. The method according to claim 23, wherein:
said step of fitting, comprises the steps of,
dividing the bounded area into a set of at least one grid, and
fitting a least cost frame sequence into each grid; and
said step of selecting comprises,
selecting the bounded area frame sequence based on the least costframe sequence from each grid.

28. The method according to claim 27, wherein said step of fitting a least cost frame sequence comprises the steps of:
selecting a grid of said set of grids;
assigning a row height (r) of the selected grid from a set of row heights;
generating frame sequences fitting the selected grid with row height (r);
placing a generated frame sequence having a least cost for the selected grid with row height (r) into a set of least cost frame sequences;
performing said steps of generating and placing for each remaining row height in the set of row heights;
selecting a lowest cost frame sequence from the set of least cost frame sequences; and
repeating, for each remaining grid, said steps of assigning, generating, placing, performing, and selecting a lowest cost frame sequence.

29. The method according to claim 28, wherein said step of generating frame sequences comprises the step of:
maintaining a number and order of frames across the lowest cost frame sequences consistent with a number and order of frames in said frame set.

30. The method according to claim 28, wherein said step of generating includes the step of:
maintaining an order of frames in said frame sequences equivalent to an order in which the frames were created.

31. The method according to claim 28, wherein said step of generating includes the step of:
altering a size of each frame to fit within a first instance of white space of the row in the selected grid.

32. The method according to claim 28, wherein:
said step of dividing comprises, dividing the bounded area into a set of at least one grid having a grid spacing of W; and
said step of generating includes the step of,
altering a size of each frame to fit within a first instance of white space of a grid space in the selected grid.

33. The method according to claim 23, further comprising the steps of:
displaying the selected frame sequence on a web page; and
linking at least one frame of the selected frame sequence to one of a segment, starting point, and menu options for display of at least one of display of a video and other information related to the linked frame.

34. The method according to claim 23, further comprising the steps of:
transferring the selected frame sequence to a tablet consisting of at least one of paper and other media;
linking at least one frame of the selected frame sequence to a code referencing information related to the linked frame.

35. A method of determining the importance of segments in a video, comprising the steps of:
creating a hierarchy of video segment selections, each level of the hierarchy segmenting the video using different criteria;
choosing a preferred video segment selection from the hierarchy;
clustering segments of the video segment selection based on at least one of a common attribute and a matching criteria to produce at least one segment cluster; and
calculating an amount of importance for each segment in the preferred video segment selection, the importance of each segment is calculated based on the length of the segment and the inverse weight of the segment cluster containing that segment.

36. The method according to claim 35, wherein said step of clustering segments of the video segment selection comprises the steps of:
evaluating at least one of proximity in time, proximity in space, proximity in color, minimum distance, color-histogram distances, and transform-coefficient distance between each segment; and
combining segments matching a predetermined threshold of the evaluating step.

37. The method according to claim 35, wherein said step of calculating comprises the step of:
calculating a weight Wi of a segment cluster based on at least a formula comprising, $$W_i = \frac{S_i}{\sum_{j=i}^{c} S_j}$$

wherein $W_i$ is the calculated weight of the segment cluster i, $S_i$ is a total length of all segments in segment cluster i, and C is a number of segment clusters in the video.

38. The method according to claim 35, wherein said step of calculating comprises the step of:
calculating an importance of each segment based on at least a formula comprising, $$I_j = L_j \log(1/W_k);$$

wherein $I_j$ is the importance of segment j; $L_j$ is a length of segment j; and $W_k$ is the calculated weight of the cluster k to which segment j belongs.

39. The method according to claim 35, wherein said step of calculating comprises the step of:
calculating an importance of each segment based on at least a formula comprising, $$I_j = L_j \log(\alpha/W_k);$$

wherein $I_j$ is the importance of segment j; $L_j$ is a length of segment j; $\alpha$ is a weighting factor, and $W_k$ is the calculated weight of the cluster k to which segment j belongs.

40. The method according to claim 35, wherein said step of calculating comprises the step of:
calculating an importance of each segment based on at least a formula comprising, $$I_j=(\Sigma_t A_t P_t(S_j))L_j \log(1/W_k);$$

wherein $A_t$ is an amplification factor, $P_t(S_j)$ is a probability estimate, $I_j$ is the importance of segment j; $L_j$ is a length of segment j, and $W_k$ is the calculated weight of the cluster k to which segment j belongs.

41. The method according to claim 35, wherein said step of calculating comprises the step of:

calculating an importance of each segment based on at least a formula comprising, $$I_j=L_j \log(\Sigma_t A_t P_t(S_j)/W_k);$$

wherein $A_t$ is an amplification factor, $P_t(S_j)$ is a probability estimate, $I_j$ is the importance of segment j; $L_j$ is a length of segment j, and $W_k$ is the calculated weight of the cluster k to which segment j belongs.

* * * * *